US010025989B2

(12) United States Patent
Drako

(10) Patent No.: US 10,025,989 B2
(45) Date of Patent: Jul. 17, 2018

(54) 3D EVENT CAPTURE AND IMAGE TRANSFORM APPARATUS AND METHOD FOR OPERATION

(71) Applicant: Dean Drako, Austin, TX (US)

(72) Inventor: Dean Drako, Austin, TX (US)

( * ) Notice: Subject to any disclaimer, the term of this patent is extended or adjusted under 35 U.S.C. 154(b) by 437 days.

(21) Appl. No.: 14/704,283

(22) Filed: May 5, 2015

(65) Prior Publication Data

US 2016/0328616 A1 Nov. 10, 2016

(51) Int. Cl.
*G06K 9/00* (2006.01)
*H04N 13/02* (2006.01)
*G08B 13/00* (2006.01)

(52) U.S. Cl.
CPC ..... *G06K 9/00771* (2013.01); *G06K 9/00362* (2013.01); *G08B 13/00* (2013.01); *H04N 13/02* (2013.01)

(58) Field of Classification Search
CPC ........... G06K 9/00771; G06K 9/00362; G08B 13/00; H04N 13/02
USPC ............................................ 348/77; 382/259
See application file for complete search history.

(56) References Cited

U.S. PATENT DOCUMENTS

| | | | | |
|---|---|---|---|---|
| 2003/0007560 A1* | 1/2003 | Mayhew | ................... | G06T 7/20 375/240.08 |
| 2003/0208335 A1* | 11/2003 | Unuma | ................ | A43B 3/0005 702/141 |
| 2005/0239028 A1* | 10/2005 | Wu | .................... | A63B 21/0023 434/257 |
| 2012/0086780 A1* | 4/2012 | Sharma | ............. | H04N 13/0022 348/46 |
| 2014/0148733 A1* | 5/2014 | Stone | ..................... | A61B 5/004 600/595 |
| 2014/0347479 A1* | 11/2014 | Givon | ................ | G06K 9/00342 348/143 |
| 2015/0003687 A1* | 1/2015 | Utsunomiya | ......... | G06T 7/2046 382/107 |
| 2016/0110593 A1* | 4/2016 | Hoof | .................... | A63F 13/428 382/103 |

* cited by examiner

*Primary Examiner* — Christopher S Kelley
*Assistant Examiner* — Matthew Kwan
(74) *Attorney, Agent, or Firm* — Patentry

(57) ABSTRACT

Images are selectively captured and transmitted by 3D security cameras to avoid congestion of a network coupling them to a central server. Skeleton detection circuits enable conditional event capture when triggered. Head, hands, and feet are associated with pixel blocks. An artificial horizon is derived from a shoulder segment. An isometric floor perspective is derived from a series of foot positions. Orientation of feet, head, or hands relative to an artificial horizon triggers event capture and transmission. Simultaneous position of two feet above the floor perspective triggers event capture and transmission. Images are transformed to effectively alert a user.

7 Claims, 5 Drawing Sheets

3D EVENT CAPTURE AND IMAGE TRANSFORM APPARATUS AND METHOD FOR OPERATION

CROSS-REFERENCES TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field
Electronic surveillance systems and digital cameras.
Description of the Related Art
As is known, 3-D cameras are commercially and economically offered for various applications, initially related to game systems.

Skeletonization is a known technique to exploit the multiple images provided by 3-D cameras in real time. Major limbs or appendages of one or more subjects are identifiable and gestures are trackable.

Motion detection is also a well known technology by comparison of one frame vs another or by frequency domain analysis of corresponding pixel blocks.

Surveillance cameras which record selected pixel blocks are known. Because JPEG compatible files consist of blocks of pixels encoded in the frequency domain, some blocks may be distinguished from others by their changing coefficients.

Modern electronic cameras capture frames of video data at 30 times per second. This is a large quantity of data which can easily cause congestion if uncontrolled. Unnecessary recording, storing, and transmitting these video frames is consume substantial bandwidth.

Hundreds of cameras can deliver images to monitors which show multiple windows in real time. This can be nearly hypnotic to a viewer.

Studies have shown that after more than one hour of viewing, a substantial percentage of human viewers cannot maintain their sensitivity or alertness. As a result, the current utility of surveillance is predominantly after the fact forensic analysis. Whose fault was it? What actually happened vs. what was claimed? Are the witnesses truthful? It is known that recollections are often contradicted by recordings.

Conventional video surveillance systems are known to be primarily used for forensic analysis long after an activity was recorded and stored. This is because, with hundreds of cameras feeding into a central monitoring station, the monotony of watching the same scene, even of moving objects, causes watchers to become inattentive after a few hours of beginning. One solution is to employ testers to simulate an event of interest in reality. Another solution is to inject computer generated avatars (guns, explosives) into security images to break up the boredom. All of these still depend on a human to recognize a non-normative object or behavior.

Conventional gaming consoles provide a 3D camera so that the player may interact with the game by moving/gesturing/acting in addition to pressing buttons or joysticks. Skeletonization circuits provide a wire frame or solid model of an apparent 3-dimensional actor.

What is needed is a real-time determination of an event of interest and immediate transmission of an alert and succinct image to a security monitoring service. What is needed is a way to call attention of the security monitoring operator to a behavior or orientation of subjects in video surveillance images which require attention, such as running, falling, lying prone or supine, and holding objects in seemingly threatening orientations.

BRIEF SUMMARY OF THE INVENTION

An apparatus provides images that are selectively captured and transmitted by 3D security cameras to avoid congestion of a network coupling them to a central server. Typically, cameras used for surveillance are fixed in orientation and view. The background of an unoccupied room or area is unchanging except for noise artifacts.

Within each 3D security camera skeleton detection circuits perform conditional event capture. A person entering, crossing, or exiting such a room can be detected with skeletonization circuits.

A circuit associates pixel blocks with head, hands, and feet at the extremities of a skeleton. The relative location of these extremities controls selection of pixel blocks in the image for further transformation and analysis.

A circuit derives an artificial horizon from a shoulder segment of the skeleton. The position of the head, spine, and feet of the skeleton relative to the artificial horizon determines an event. A circuit triggers an event capture and image transformation by comparing position and orientation of feet, head, or hands relative to an artificial horizon.

A circuit integrates a series of foot positions to determine an isometric floor perspective. The distance between footfalls and the elevation of both feet above the floor determines an event. A circuit triggers event capture and image transformation upon determining simultaneous position of two feet above the floor perspective.

A circuit transforms and transmits images to effectively alert a user. The portion of a captured image which contains a skeleton is expanded to fill a screen when an event is triggered. Higher definition or resolution is retained for portions of the subject while lossy compression is applied to unimportant pixel blocks.

As is known, circuits as specified herein may be embodied in digital logic, programmable logic devices such as gate arrays and field programmable gate arrays, and computing devices such as microprocessors coupled to non-transitory stores of executable instructions.

BRIEF DESCRIPTION OF THE SEVERAL VIEWS OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DISCLOSURE OF EMBODIMENTS OF THE INVENTION

Figure 1:
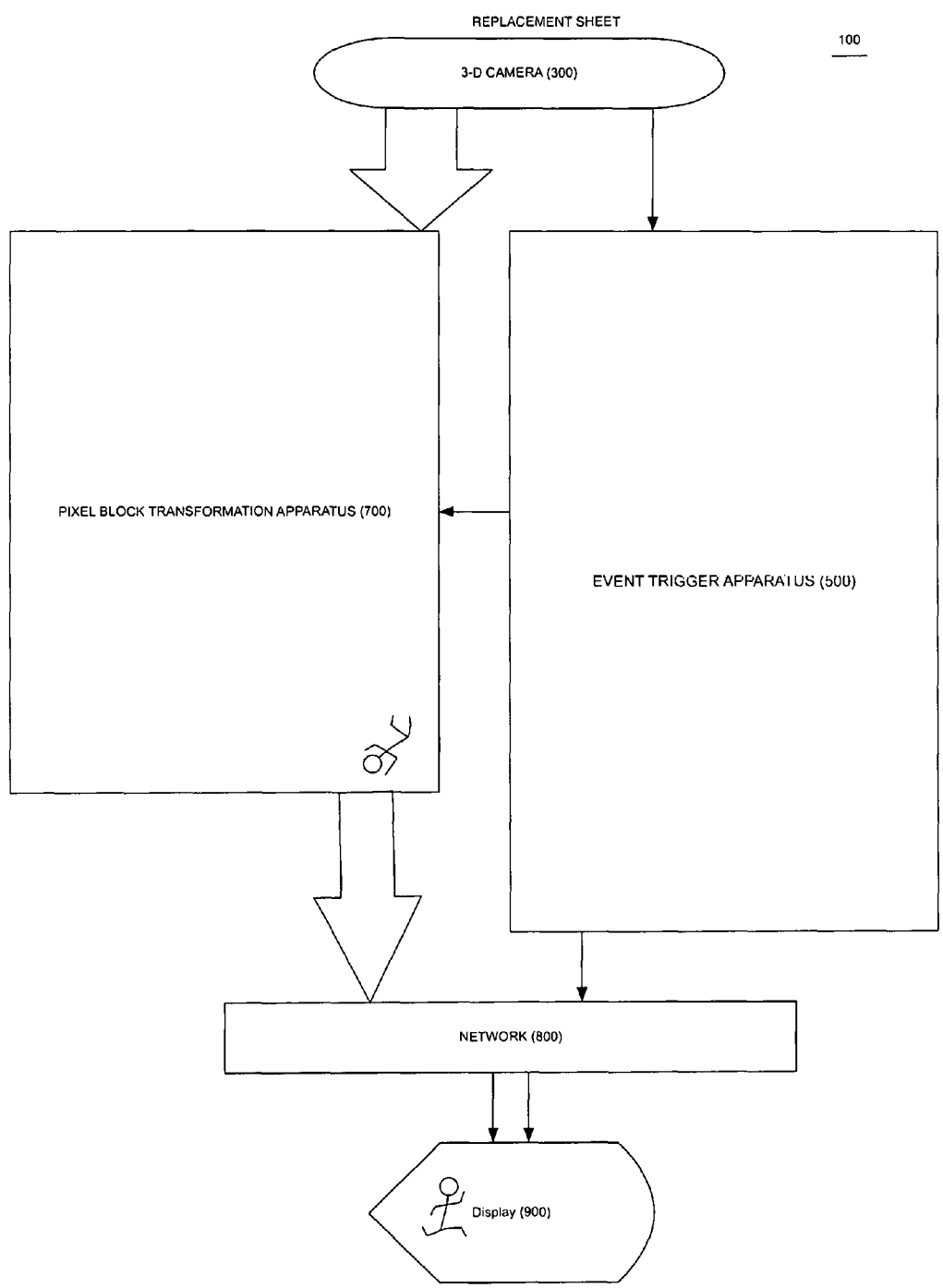
FIG. 1-3 are block diagrams of a system and its components.

One aspect of the invention is a 3d video analysis and alerting system consisting of the following:
a. a 3D video camera outputting 2 image streams,
b. a computing device that transforms the 3D camera images into skeletons, and
c. a computing device that analyzes the skeletonization movement to determine at least one of the following exemplary but non-limiting events:
  1. falling person
  2. laying person
  3. running person
  4. frantic person
  5. fleeing person
  6. gun wielding person
  7. attacking person.

Upon determining an event, such as but not limited to the above, the system also operates an alerting system that can display or otherwise notify interested people of the movement event:
  1. alerts via video display, or
  2. alerts via email, text message, or other electronic means.

A system alerts a user by narrowing the field of view of a display when an event is determined. An image is cropped to contain the dimensions of a skeleton determined by operating on images captured by a 3-D digital camera and then expanded to fill a display screen.

Certain postures or orientation of the skeleton trigger an event capture, transformation, transmission, and display. These correspond to running, falling, lying prone or supine, threatening, or waving.

An apparatus applies measurements and rules to match a surveillance image with predefined events and transforms the image into an alert.

An apparatus provides images that are selectively captured and transmitted by 3D security cameras to avoid congestion of a network coupling them to a central server. In addition to conserving network bandwidth, the avoidance of overwhelming the attention bandwidth of viewers is an objective of the present invention. A more dramatic presentation of events is desired to address inattention.

In an embodiment, a video surveillance camera provides two video streams. Together, the streams enable a skeletonization circuit to identify the location of segments and extremities of a person and the pixel blocks containing each.

In an embodiment, each 3D security camera skeleton detection circuits enable conditional event capture. Only images which are related to skeleton detection should be captured, transmitted, and stored.

Using the extremities of each skeleton, pixel blocks are selected that correspond to head, hands, and feet. The relative position of these blocks to one another and to the spine segment of the skeleton determines a type of event.

An artificial horizon is inferred from the orientation of the shoulder segment segments of the skeleton.

An isometric floor perspective is inferred from a series of foot positions as the subject traverses the viewport. Even though a person is seen in perspective, the feet of a person entering and crossing a room should come to rest on a monotonically ascending or descending sequence.

In order to determine that the subject of an image capture has fallen, one test is to locate an artificial horizon and measure the position and orientation of the skeleton relative to the artificial horizon. When the head is below or the feet are above the artificial horizon that condition triggers a "fallen" event capture and transmission. If the hands are below the artificial horizon and the feet are above the artificial horizon that condition triggers a "fallen" event capture and transmission.

In order to determine that the subject of an image capture is running, one test is to locate the position of both feet. If both feet are not in contact with the floor at any point in time, that condition triggers event capture and transmission. A circuit measures a series of foot positions and infers a floor from the maximum downward displacement of each foot.

The apparatus operates on the captured images by cropping to remove inessential background, to scale the remaining box containing the subject to the size of the display hardware, and adjusting compression and resolution of portions of the image to bring the event to the attention of the display user.

One aspect of the invention is an event capture apparatus that includes: a network interface; a non-transitory store; a circuit to track at least one skeleton received from a skeletonization circuit; and a circuit to transmit an alert upon an event capture.

In an embodiment the apparatus also includes a circuit to determine a skeleton from a stream of images, the circuit coupled to a 3-D video camera. In another embodiment, the apparatus is coupled to a camera that incorporates a sensor and a built-in skeleton tracking circuit.

In an embodiment, the apparatus also includes a circuit to associate an artificial horizon to a shoulder segment; a circuit to identify at least one hand at the end of an arm segment; and a circuit to trigger event capture when at least one hand is above the artificial horizon.

In an embodiment, the apparatus also has a circuit to associate an artificial horizon to a shoulder segment; a circuit to identify at least one foot at the end of a leg segment; and a circuit to trigger event capture when at least one foot is above the artificial horizon.

In an embodiment, the apparatus also has a circuit to define a base by the span between two feet; a circuit to define an apparent center of mass among hands, head, shoulder, and spine; and a circuit to trigger an event capture when the apparent center of mass is not above the base.

In an embodiment, the apparatus also has a circuit to identify a first foot and a second foot at the ends of each leg segment; a circuit to record the maximum downward travel of the first foot in a sequence of images; a circuit to record the maximum downward travel of the second foot in a sequence of images; a circuit to identify an isometric floor line below which each foot does not descend; and a circuit to trigger an event capture when both feet are not abutting the floor.

In an embodiment, the apparatus also has: a circuit to measure leg length; a circuit to determine a body centerline; a circuit to trigger event capture when horizontal distance from a foot to body centerline>square root of 2×leg length.

In an embodiment, the apparatus also has: a circuit to measure maximum stride length between feet; a circuit to determine a body center line below a head; a circuit to determine a vertical measure from head to foot when foot crosses body center line; and a circuit to trigger event capture when stride length is >0.5×vertical measure.

In an embodiment, the apparatus also has: a circuit to determine each shoulder position; a circuit to determine each hand position; and a circuit to trigger event capture when a shoulder and both hands are in a straight line.

In an embodiment, the apparatus also has: a circuit to determine a head position; a circuit to determine each hand position; and a circuit to trigger event capture when head and both hands are in a straight line.

Another aspect of the invention is a system that includes: a user display; an image store of captured events; the store coupled to the user display, an event capture apparatus; the event capture apparatus coupled to the image store, a skeletonization device; the device coupled to the event capture apparatus, and a 3-D video camera; the camera coupled to the skeletonization device.

In an embodiment, the system also includes an image transformation apparatus that comprises: a circuit to determine pixel blocks that contain the head, hands, and feet of a skeleton; a circuit to scope a video image to a bounding box that contains the head, hands, and feet of a skeleton and exclude pixel blocks that are exterior to the bounding box; a circuit to scale the scoped image to fit the display parameters; and, a circuit to transmit the scaled image to the display.

In an embodiment, the event capture apparatus causes an alert to be transmitted to the display when at least one of head is below the level of the feet, both hands are below the level of both feet, and center of mass of the skeleton is substantially at or below the level of both feet.

In an embodiment, the event capture apparatus causes an alert to be transmitted to the display when shoulder and both hands are poised in a substantially straight linear alignment.

In an embodiment, the event capture apparatus causes an alert to be transmitted to the display when both feet are simultaneously above the isometric floor, and a stride length between the feet is substantially longer than twice a leg length.

Another aspect of the invention is a method for operation of an event capture apparatus, the method including several processes: recording at least one image at a 3-D digital camera; generating a skeleton from the image; reading a store of previously generated skeletons; triggering event capture when a generated skeleton substantially matches a stored skeleton; selecting pixel blocks for terminus of spine, arm, and leg segments of the skeleton for image transformation; transmitting viewports and thumbnail images with pixel blocks; and transmitting an alert to a remote user operating a computer monitor.

In an embodiment, the method also includes a process to determine when a generated skeleton substantially matches a stored skeleton by the following steps: determining a first vector substantially aligned from head of the stored skeleton along the spine to the hip; determining a second vector substantially aligned from the head of the generated skeleton along the spine to the hip; and determining the angle of the first vector to vertical is within 15 degrees of the angle of the second vector to vertical.

In an embodiment, the method also includes the processes: selecting pixel blocks for compression to lower resolution formats that do not contain portions of one of a head, a hand, and a foot.

Another aspect of the invention is a three dimensional (3-D) video analysis and alerting system that includes: a 3-D video camera outputting a first image stream and a second image stream; a first computing device that transforms camera images into a series of skeletons; the computing device coupled to the output of the video camera; and a second computing device, which is coupled to the first computing device, that analyzes the movement of the series of skeletons to determine at least one of the following movement events: falling person, laying person, running person, frantic person, fleeing person, weapon wielding person, and, attacking person.

In an embodiment, the system also includes an alerting system that transmits a notification to interested people of the movement event by one of: an alert via video display, and a non-video alert via an electronic message.

It is understood that 3-D video cameras may operate in the visible spectrum and the invisible spectrum or both. It is understood that 3-D cameras include both pairs of offset video cameras for binocular vision or one visible spectrum camera and a depth sensing camera.

Another aspect of the invention is an event capture apparatus which includes a network interface; a non-transitory store; a 3-D digital camera having skeletonization circuits; and a circuit to trigger event capture on position of skeleton elements; whereby alerts with thumbnail images and viewports to be transmitted are substantially reduced in size from the original 3-D image which improves bandwidth consumption of the network coupling the apparatus to a server.

In an embodiment, the apparatus also has a circuit to identify pixel blocks containing head, hands, feet, and spine; a circuit to define a bounding box for a viewport, the bounding box to contain pixel blocks for head, hands, feet, and spine; and a circuit to generate a thumbnail image of the viewport.

In an embodiment, the apparatus also has a circuit to associate an artificial horizon to a shoulder segment; a circuit to identify at least one hand at the end of an arm segment; a circuit to trigger event capture when at least one hand is above the artificial horizon; and a circuit to transmit an alert with pixel blocks containing head and hands.

In an embodiment, the apparatus also has a circuit to associate an artificial horizon to a shoulder segment; a circuit to identify at least one foot at the end of a leg segment; a circuit to trigger event capture when at least one foot is above the artificial horizon; and a circuit to transmit an alert with pixel blocks containing head and feet.

In an embodiment, the apparatus also has a circuit to define a base by the span between two feet; a circuit to define an apparent center of mass among hands, head, shoulder, and spine; and a circuit to trigger an event capture when the apparent center of mass is not above the base.

In an embodiment, the apparatus also has a circuit to identify a first foot and a second foot at the ends of each leg segment; a circuit to record the maximum downward travel of the first foot in a sequence of images; a circuit to record the maximum downward travel of the second foot in a sequence of images; a circuit to identify an isometric floor line below which each foot does not descend; and a circuit to trigger an event capture when both feet are not abutting the floor.

In an embodiment, the apparatus also has a circuit to measure leg length; a circuit to determine a body centerline; a circuit to trigger event capture when horizontal distance from a foot to body centerline>square root of 2×leg length.

In an embodiment, the apparatus also has a circuit to measure maximum stride length between feet; a circuit to determine a body center line below a head; a circuit to determine a vertical measure from head to foot when foot crosses body center line; and a circuit to trigger event capture when stride length is >0.5×vertical measure.

In an embodiment, the apparatus also has a circuit to determine each shoulder position; a circuit to determine each hand position; and a circuit to trigger event capture when a shoulder and both hands are in a straight line.

In an embodiment, the apparatus also has a circuit to determine a head position; a circuit to determine each hand position; and a circuit to trigger event capture when head and both hands are in a straight line.

Another aspect of the invention is a method for operation of an event capture apparatus that includes generating a skeleton from a 3-D digital camera; reading a store of previously generated skeletons; triggering event capture when a generated skeleton substantially matches a stored skeleton; selecting pixel blocks for terminus of spine, arm, and leg; transmitting viewports and thumbnail images with pixel blocks; and transmitting an alert to a remote user operating a computer monitor.

In an embodiment, the method further has a process to determine when a generated skeleton substantially matches a stored skeleton by measuring the angle from the vertical of spines or legs.

In an embodiment the image is cropped to remove background beyond the extent of the skeleton. In an embodiment the image is variably compressed to reduce resolution of background and abdomen of the subject. In an embodiment, a circuit transfers pixel blocks to a facial recognition system by tracing the skeleton.

Referring now to the figures, which illustrate a non-limiting implementation, FIG. 1 shows a a block diagram of a system 100 that includes an event trigger apparatus 500 (trigger) and a pixel block transformer apparatus 700 (transformer), both coupled to a 3-D camera 300. Both the transformer and the trigger are also communicatively coupled to a display 900 through a network to alert a user when an event occurs and to represent the event with an image. The event trigger receives a skeleton from the 3-D camera and provides the location of a pixel block to the transformer and transmits an alert to the display. The transformer receives an image from the 3-D camera and transmits selected pixel blocks to the display.

Figure 2:
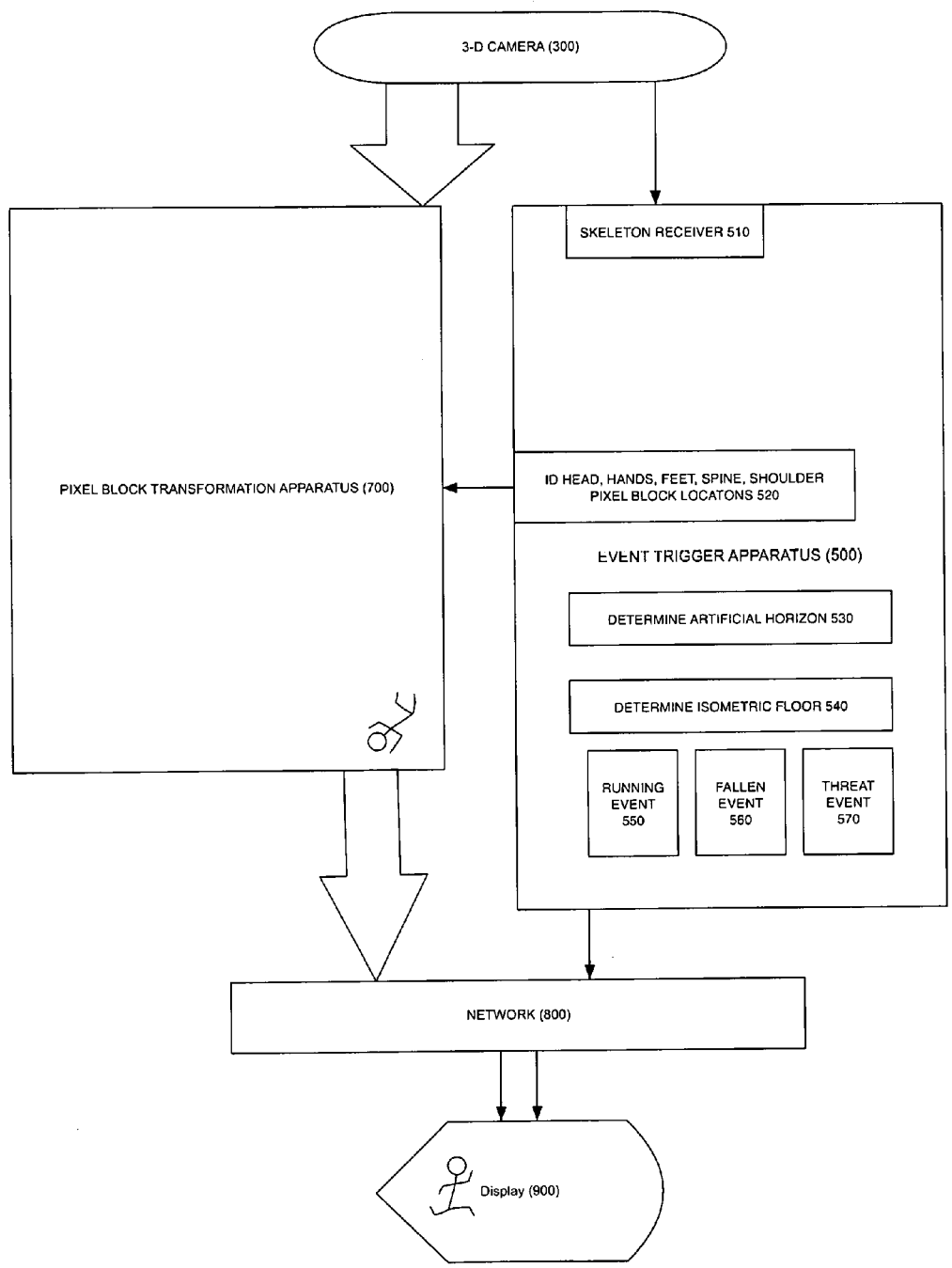

FIG. 2 is a block diagram of components of event trigger apparatus 500 that includes: a skeleton receiver circuit 510; a circuit to identify locations of head, hands, feet, spine, and shoulders and their constituent pixel block locations 520; a circuit to determine an artificial horizon 530; a circuit to determine an isometric floor 540; a circuit to determine a running posture 550; a circuit to determine a fallen posture 560; and a circuit to determine a threatening posture 570.

Figure 3:
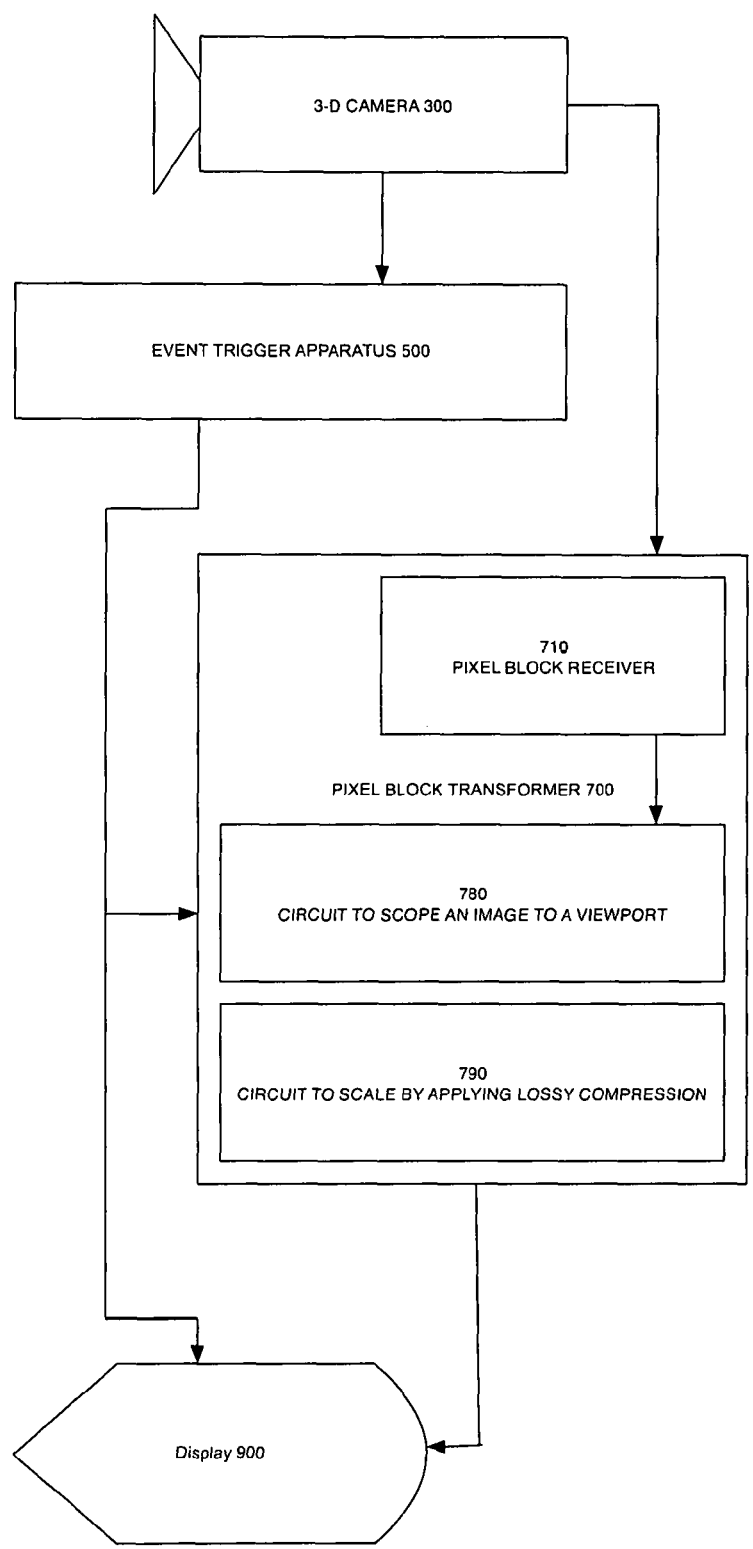

FIG. 3 is a block diagram of components of a pixel block transformer apparatus 700 that includes: a pixel block receiver 710; a circuit to scope an image received from a 3-D camera to a viewport defined by the locations of the pixel blocks identified by the event trigger apparatus 780; and a circuit to scale the viewport to the screen resolution of the display 790 by applying lossy compression to some pixel blocks and retaining higher definition of locations identified by the event trigger.

Figure 4:
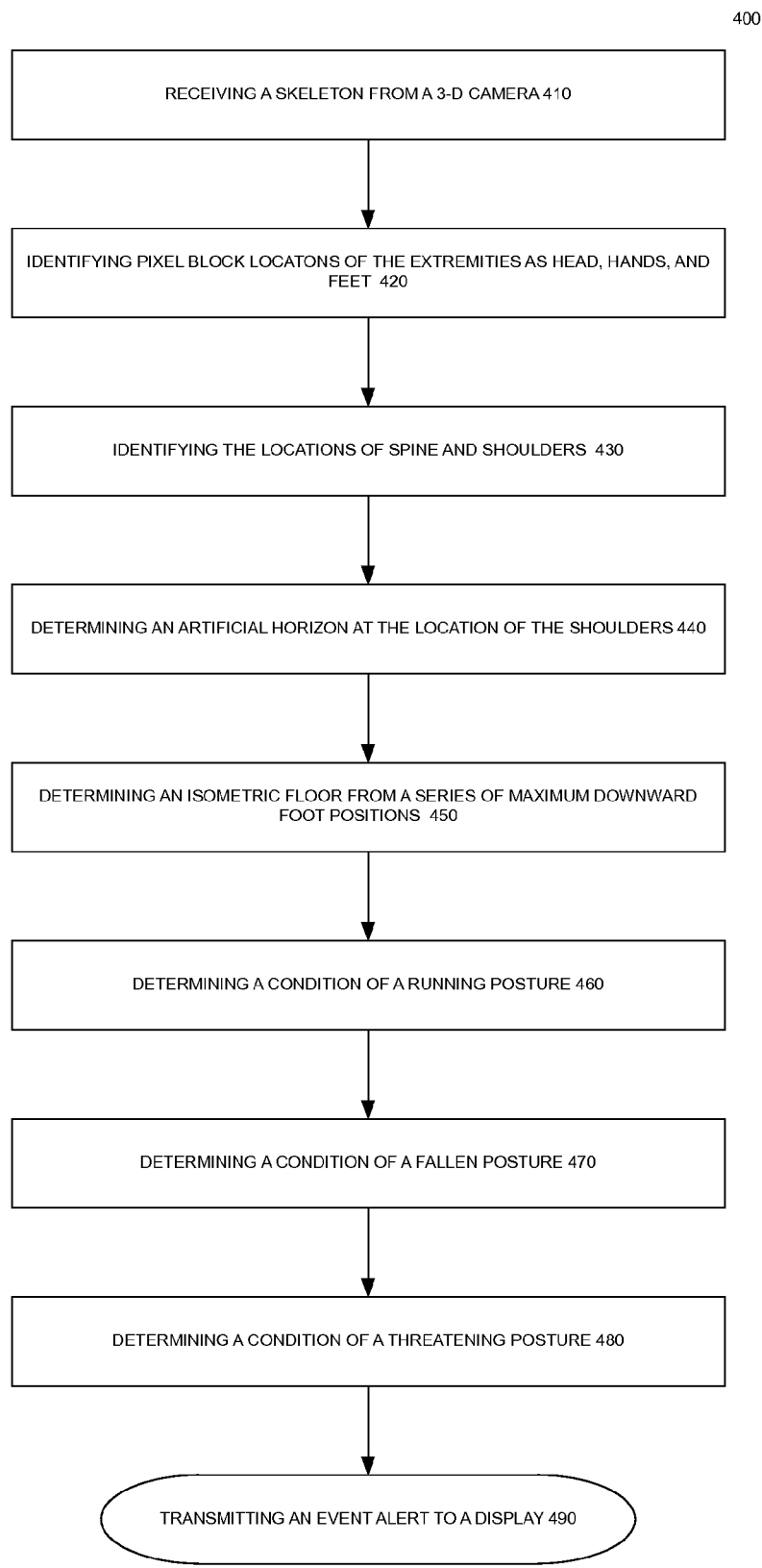
FIG. 4-5 are flowcharts of processes in each method of operation of the components of apparatuses of the system.

FIG. 4 is a flowchart of processes that comprise a method 400 for operation of the event trigger apparatus: receiving a skeleton from a 3-D camera 410; identifying pixel block locations of the extremities as head, hands and feet 420; identifying the locations of spine and shoulders 430; determining an artificial horizon at the location of the shoulders 440; determining an isometric floor from a series of maximum downward foot positions 450; determining a condition of a running posture 460; determining a condition of a fallen posture 470; determining a condition of a threatening posture 480; and, transmitting an event alert to a display 490.

Figure 5:
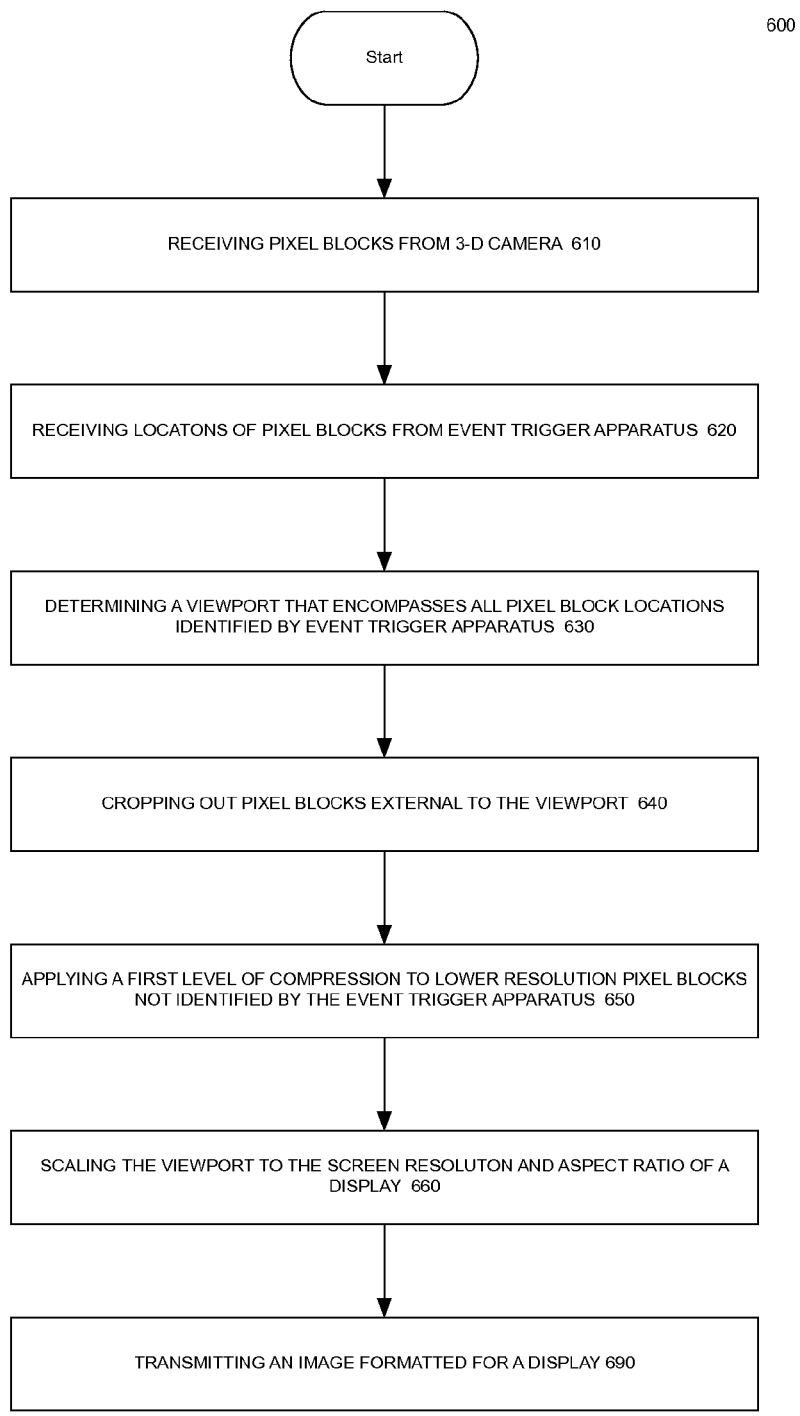

FIG. 5 is a flowchart of processes included in a method 600 for operation of the pixel block transform apparatus: receiving a plurality of pixel blocks from a 3-D camera 610; receiving locations of pixel blocks from an event trigger apparatus 620; determining a viewport that encompasses all pixel block locations identified by the event trigger apparatus 630; cropping out pixel blocks external to the viewport 640; applying a first level of compression to lower resolution of pixel blocks not identified by the event trigger apparatus 650; scaling the viewport to the screen resolution and aspect ratio of a display 660; and transmitting an image formatted for a display 690.

It is understood that circuits described above can be implemented as digital logic gates in a mask programmed standard cell or gate array. The circuits may equally be embodied in a programmable logic device depending on fuses or electrically erasable flash memory or firmware. The circuits may equally be embodied in Field Programmable Gate Arrays configured by non-transitory storage such as flash or read only memories (ROM). The circuits above may equally be embodied as processors adapted by instructions in non-transitory storage to perform the specific logic functions.

It should be appreciated that the transformation of a raw video feed from a 3-D camera into an alert for a specific surveillance event that is presented on a display, or mobile communication device as limited in the attached claims may be implemented in hardware circuits or in programmable circuits which execute instructions stored in non-transitory media.

CONCLUSION

Thus it can be appreciated that the invention is easily distinguished from conventional surveillance systems that merely detect motion. Any public space will normally have persons and objects constantly moving through the field of view except in the dead of night. The present invention can be easily distinguished from pattern matching because a sequence of images is analyzed to determine a floor or length of stride.

The invention can easily be distinguished from facial recognition systems by selecting a relative position of a head in any orientation with respect to the shoulders, hands, arms, and legs. The invention can be distinguished from conventional generic computer systems by a circuit that crops an image to enclose a skeleton and by a circuit that provides higher resolution of pixel blocks at one or more extremities of a skeleton in comparison with a compressed lower resolution pixel block containing the abdomen or the background of a skeleton image.

The techniques described herein can be implemented in digital electronic circuitry, or in computer hardware, firmware, software, or in combinations of them. The techniques can be implemented as a wireless device, i.e., firmware tangibly embodied in a non-transitory medium, e.g., in a machine-readable storage device, for execution by, or to control the operation of circuit apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and connected by a wireless network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

I claim:

1. An event capture apparatus comprises:
a network interface;
a non-transitory store;
a circuit to track at least one skeleton received from a skeletonization circuit; and
a circuit to transmit an alert upon an event capture;
a circuit to measure leg length; a circuit to determine a body centerline; and,
a circuit to trigger event capture when horizontal distance from a foot to body centerline>square root of 2.times.leg length.

2. An event capture apparatus comprises:
a network interface;
a non-transitory store;
a circuit to track at least one skeleton received from a skeletonization circuit; and
a circuit to transmit an alert upon an event capture;
a circuit to measure maximum stride length between feet;
a circuit to determine a body center line below a head;
a circuit to determine a vertical measure from head to foot when foot crosses body center line; and
a circuit to trigger event capture when stride length is >0.5.times.vertical measure.

3. The apparatus of claim 2 further comprising: a circuit to determine each shoulder position; a circuit to determine each hand position; and a circuit to trigger event capture when a shoulder and both hands are in a straight line.

4. The apparatus of claim 2 further comprising: a circuit to determine a head position; a circuit to determine each hand position; and a circuit to trigger event capture when head and both hands are in a straight line.

5. A system comprising:
a user display;
an image store of captured events; the store coupled to the user display,
an event capture apparatus; the event capture apparatus coupled to the image store,
a skeletonization device (device); the device coupled to the event capture apparatus; and a
3-D video camera (camera),
the camera coupled to the skeletonization device; wherein the event capture apparatus causes an alert to be transmitted to the display when both feet are simultaneously above an isometric floor, and a stride length between the feet is substantially longer than twice a leg length.

6. A method for operation of an event capture apparatus comprising:
recording at least one image at a 3-D digital camera;
generating a skeleton from a 3-D digital camera;
reading a store of previously generated skeletons;
triggering event capture when a generated skeleton substantially matches a stored skeleton;
selecting pixel blocks for terminus of spine, arm, and leg segments of the skeleton for image transformation;
transmitting viewports and thumbnail images with pixel blocks;
transmitting an alert to a remote user operating a computer monitor; and, process to determine when a generated skeleton substantially matches a stored skeleton by
determining a first vector substantially aligned from head of the stored skeleton along the spine to the hip;
determining a second vector substantially aligned from the head of the generated skeleton along the spine to the hip; and
determining the angle of the first vector to vertical is within 15 degrees of the angle of the second vector to vertical.

7. The method of claim 6 further comprising: selecting pixel blocks for compression to lower resolution formats that do not contain portions of one of a head, a hand, and a foot.

* * * * *